United States Patent
Kim et al.

(10) Patent No.: US 12,490,239 B2
(45) Date of Patent: Dec. 2, 2025

(54) METHOD AND DEVICE FOR PERFORMING PAGING OPERATION ON BASIS OF PLURALITY OF SUBSCRIBER IDENTITY MODULES (SIMs) IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 18/014,251

(22) PCT Filed: Jul. 7, 2021

(86) PCT No.: PCT/KR2021/008654
§ 371 (c)(1),
(2) Date: Jan. 3, 2023

(87) PCT Pub. No.: WO2022/010258
PCT Pub. Date: Jan. 13, 2022

(65) Prior Publication Data
US 2023/0262657 A1 Aug. 17, 2023

(30) Foreign Application Priority Data
Jul. 8, 2020 (KR) .................. 10-2020-0083986

(51) Int. Cl.
*H04W 68/12* (2009.01)
*H04W 68/02* (2009.01)
(Continued)

(52) U.S. Cl.
CPC ........... *H04W 68/12* (2013.01); *H04W 68/02* (2013.01); *H04W 76/30* (2018.02); *H04W 88/06* (2013.01)

(58) Field of Classification Search
CPC ........................ H04W 36/00698; H04L 1/08
See application file for complete search history.

(56) References Cited

U.S. PATENT DOCUMENTS 10,687,300 B2  6/2020 Youn et al.
11,387,942 B2 *  7/2022 Panteleev ............. H04L 5/0094
(Continued)

FOREIGN PATENT DOCUMENTS

KR  10-2019-0021462 A  3/2019
KR  10-2021-0020384 A  2/2021

OTHER PUBLICATIONS

O. Vikhrova, S. Pizzi, A. Terzani, L. Araujo, A. Orsino and G. Araniti, "Multi-SIM Support in 5G Evolution: Challenges and Opportunities," in IEEE Communications Standards Magazine, vol. 6, No. 2, pp. 64-70, Jun. 2022, doi: 10.1109/MCOMSTD0001. 210004 (Year: 2022).*

(Continued)

*Primary Examiner* — William D Cumming
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to various embodiments of the present invention, provided are a method and a device for perform- (Continued)

ing a paging operation in a plurality of SIMs in a next generation mobile communication system.

10 Claims, 15 Drawing Sheets

(51) Int. Cl.
*H04W 76/30* (2018.01)
*H04W 88/06* (2009.01)

(56) References Cited

U.S. PATENT DOCUMENTS

| | | | |
|---|---|---|---|
| 2013/0150095 A1 | 6/2013 | Mehio et al. | |
| 2019/0268097 A1* | 8/2019 | Panteleev | H04L 1/08 |
| 2020/0396656 A1* | 12/2020 | Yang | H04W 36/00698 |

OTHER PUBLICATIONS

LG Electronics et al: "KI #1, New Sol: Network-based paging filtering", 3GPP Draft; S2-2004589, 3rd Generation Partnership Project (3GPP), Mobile Competence Centre ; 650, Route Des Lucioles ; F-06921 Sophia-Antipolis Cedex ; France; Jun. 12, 2020.
Extended European Search Report dated Jun. 3, 2024, issued in European Application No. 21837631.7.
Huawei et al., 'KI#3, Sol #6: Update for data handling after UE leaves', S2-2004597, 3GPP TSG SA WG2 #139E, Elbonia, Jun. 12, 2020.
Vivo et al., 'New WID: Support for Multi-SIM devices for LTE/NR', RP-201309, 3GPP TSG RAN #88e, Jul. 1, 2020.
Motorola Mobility et al., 'Solution for MT service delivery when multiple USIMs are registered in the same serving PLMN', S2-2000275, 3GPP TSG SA WG2 #136AH, Incheon, South Korea, Jan. 4, 2020.

* cited by examiner

METHOD AND DEVICE FOR PERFORMING PAGING OPERATION ON BASIS OF PLURALITY OF SUBSCRIBER IDENTITY MODULES (SIMs) IN NEXT GENERATION MOBILE COMMUNICATION SYSTEM

TECHNICAL FIELD

The disclosure relates to operations of a terminal and a base station in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G systems are expected to support more various services compared to existing 4G systems. For example, the most representative services may include enhanced mobile broadband (eMBB), ultra-reliable and low-latency communication (URLLC), massive machine type communication (mMTC), and evolved multimedia broadcast/multicast service (eMBMS). Also, a system providing a URLLC service may be referred to as a URLLC system, and a system providing an eMBB service may be referred to as an eMBB system. In addition, the terms "service" and "system" may be used interchangeably.

Among them, the URLLC service is a service newly considered in the 5G system, unlike the existing 4G system, and requires satisfaction of ultra-high reliability (e.g., packet error rate of about $10^{-5}$) and very low latency (e.g., about 0.5 msec) conditions compared to other services. To satisfy such strict requirements, the URLLC service may need to utilize a shorter transmission time interval (TTI) than the eMBB service, and various operation methods using this are being considered.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

To enable a multi-SIM terminal to smoothly perform paging reception on the other network, there is proposed a method in which service type information is included in the paging message and the network in connected mode is requested to release the connected mode so that the multi-SIM terminal can smoothly perform idle-mode operation (monitoring and receiving paging, receiving system information, receiving public warning system (PWS) information, tracking area update (TAU)) on the other network.

The technical objectives to be achieved in the disclosure are not limited to those mentioned above, and other technical objectives not mentioned will be clearly understood by those of ordinary skill in the art to which the disclosure belongs from the following description.

Solution to Problem

In the disclosure for solving the above problems, a method of a terminal supporting a first subscriber identity module (SIM) and a second SIM in a wireless communication system may include: receiving, while the terminal is in connected state with a first base station of a first network corresponding to the first SIM, a paging message including information indicating a specific service from a second base station of a second network corresponding to the second SIM; determining whether to release the connection to the first network and to connect to the second network based on the paging message; and transmitting a connection release request message including information on a release cause to the first base station based on a determination result.

Meanwhile, according to another embodiment, a method for transmitting a paging message of a second base station associated with a second network in a wireless communication system may include: receiving a paging message for a specific service from a core network; and transmitting, while a terminal supporting a first subscriber identity module (SIM) and a second SIM is in connected state with a first base station of a first network corresponding to the first SIM, a paging message including information indicating the specific service to the terminal, and wherein whether to release the connection to the first network and to make a connection to the second network may be determined based on the paging message, and a connection release request message including information on a release cause may be transmitted to the first base station based on a determination result.

Meanwhile, according to another embodiment of the disclosure, a terminal supporting a first subscriber identity module (SIM) and a second SIM in a wireless communication system may include: a transceiver; and a controller that is configured to: control, while the terminal is in connected state with a first base station of a first network corresponding to the first SIM, the transceiver to receive a paging message including information indicating a specific service from a second base station of a second network corresponding to the second SIM; determine whether to release the connection to the first network and to connect to the second network based on the paging message; and control the transceiver to transmit a connection release request message including information on a release cause to the first base station based on a determination result.

Meanwhile, according to another embodiment of the disclosure, a second base station associated with a second network in a wireless communication system may include: a transceiver; and a controller that is configured to: receive a paging message for a specific service from a core network; and control, while a terminal supporting a first subscriber identity module (SIM) and a second SIM is in connected state with a first base station of a first network corresponding to the first SIM, the transceiver to transmit a paging message including information indicating the specific service to the terminal, and wherein whether to release the connection to the first network and to make a connection to the second network may be determined based on the paging message, and a connection release request message including information on a release cause may be transmitted to the first base station based on a determination result.

Advantageous Effects of Invention

To enable a multi-SIM terminal to smoothly perform paging reception on the other network, there is proposed a method in which service type information is included in the paging message and the network in connected mode is requested to release the connected mode so that the multi-SIM terminal can smoothly perform idle-mode operation (monitoring and receiving paging, receiving system information, receiving public warning system (PWS) information, tracking area update (TAU)) on the other network.

The effects that can be obtained in the disclosure are not limited to those mentioned above, and other effects not mentioned will be clearly understood by those of ordinary skill in the art to which the disclosure belongs from the following description.

MODE FOR THE INVENTION

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. Further, the terms described below are defined in consideration of their functions in the disclosure, and these may vary depending on the intention of the user, the operator, or the custom. Hence, their meanings should be determined based on the overall contents of this specification. Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in the 3rd Generation Partnership Project Long Term Evolution (3GPP LTE) standards. However, the disclosure is not limited by the above terms and names, and may be equally applied to systems conforming to other standards.

Figure 1:
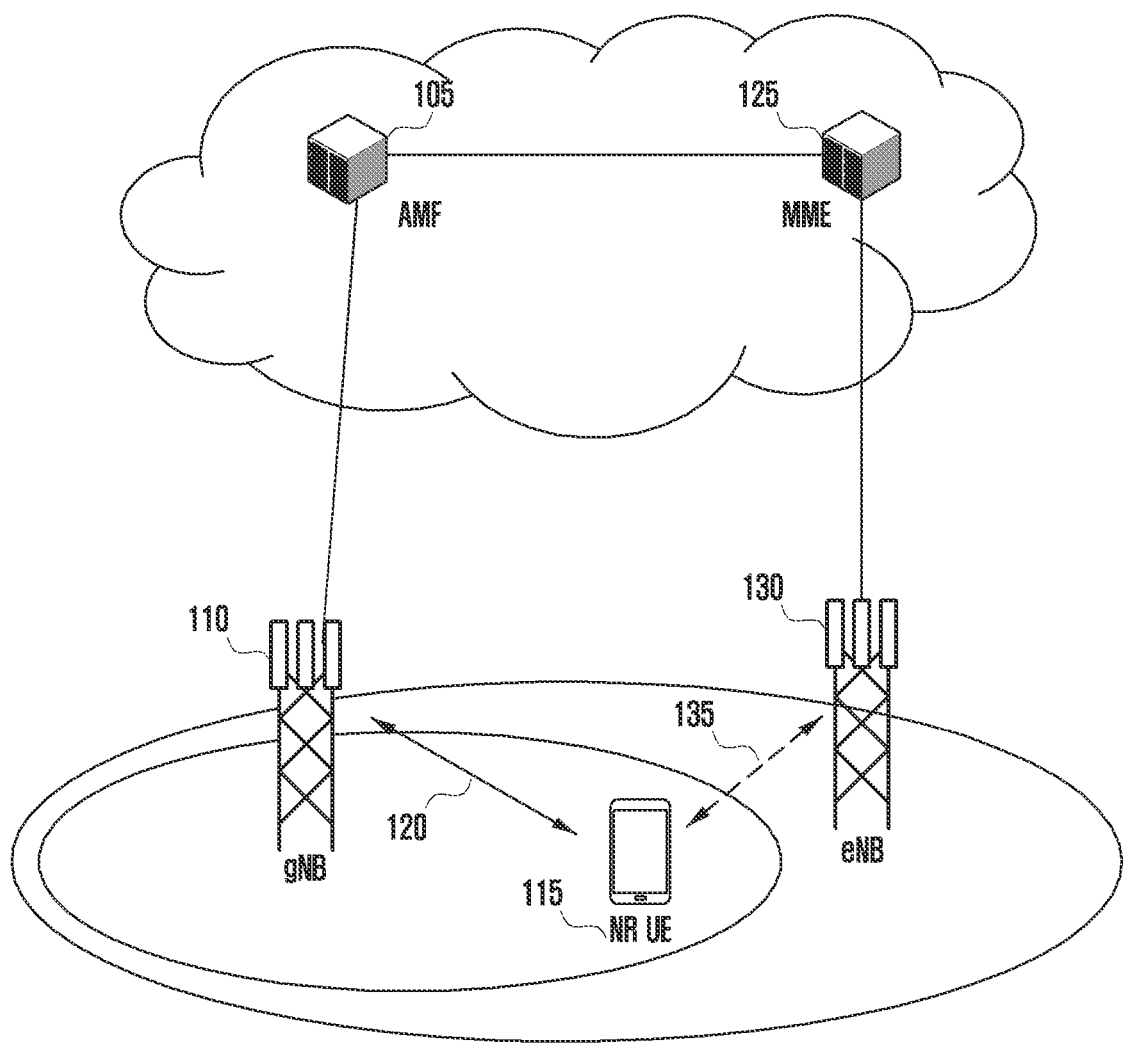
FIG. 1 is a diagram showing the architecture of a next-generation mobile communication system according to an embodiment of the disclosure.

FIG. 1 is a diagram showing the architecture of a next-generation mobile communication system according to an embodiment of the disclosure.

With reference to FIG. 1, the radio access network of a next-generation mobile communication system (new radio, NR) may be composed of a new radio node B (hereinafter, gNB) 110 and an AMF (new radio core network) 105. A new radio user equipment (hereinafter, NR UE or terminal) 115 may connect to an external network through the gNB 110 and the AMF 105.

In FIG. 1, the gNB 110 corresponds to an evolved node B (eNB) of the existing LTE system. The gNB 110 may be connected to the NR UE 115 through a radio channel, and it can provide a more superior service than that of the existing node B (120). As all user traffic is serviced through shared channels in the next-generation mobile communication system, there is a need for an entity that performs scheduling by collecting status information, such as buffer states, available transmission power states, and channel states of individual UEs 115, and the gNB 110 takes charge of this. In a typical situation, one gNB 110 controls a plurality of cells. To implement ultra-high-speed data transmission compared with current LTE, a bandwidth beyond the existing maximum bandwidth may be utilized, and a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE is applied. The AMF 105 performs functions such as mobility support, bearer configuration, and QoS configuration. The AMF 105 is an entity taking charge of not only mobility management but also various control functions for the UE, and may be connected to a plurality of base stations. In addition, the next-generation mobile communication system may interwork with the existing LTE system, and the AMF 105 is connected to the MME 125 through a network interface. The MME 125 is connected to an eNB 130 being an existing base station. The UE supporting LTE-NR dual connectivity may transmit and receive data while maintaining connections to both the gNB 110 and the eNB 130 (135).

Figure 2:
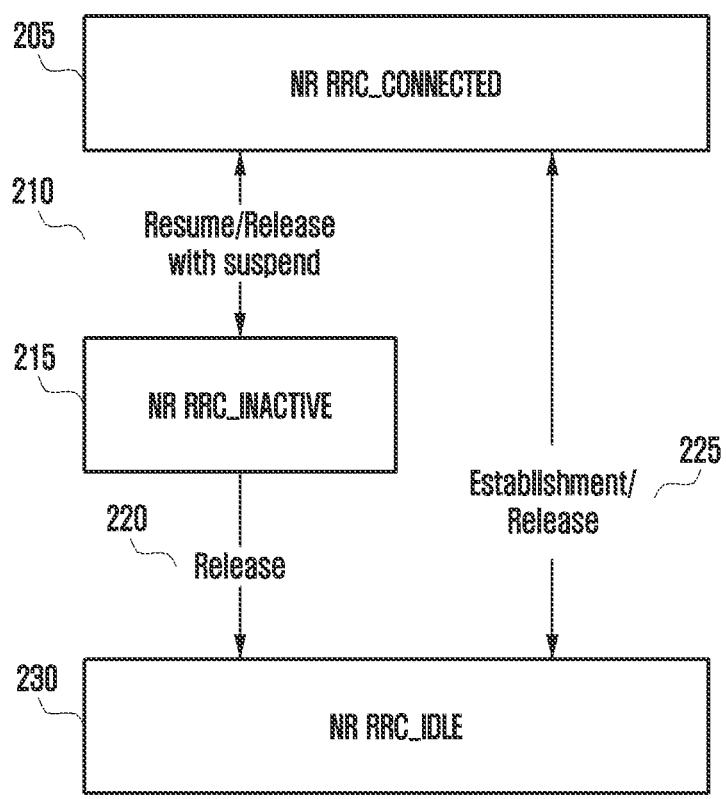
FIG. 2 is a diagram illustrating radio connection state transitions in the next-generation mobile communication system according to an embodiment of the disclosure.

FIG. 2 is a diagram illustrating radio connection state transitions in the next-generation mobile communication system according to an embodiment of the disclosure.

The next-generation mobile communication system has three radio connection states (RRC states). The connected mode (RRC_CONNECTED, 205) is a radio connection state in which the UE can transmit and receive data. The idle mode (RRC_IDLE, 230) is a radio connection state in which the UE monitors whether paging is transmitted to it. These two modes are a radio connection state that is also applied to the existing LTE system, and the detailed description thereof is the same as that of the existing LTE system. In the next-generation mobile communication system, the inactive mode (RRC_INACTIVE, 215) is newly defined as a radio connection state. In this radio connection state, UE contexts are maintained in the base station and the UE and RAN-based paging is supported. The characteristics of the new radio connection state are listed below.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

The new "inactive" radio connection state may transition to connected mode or idle mode by using a specific procedure. Inactive mode transitions to connected mode according to a resume process, and connected mode transitions to inactive mode by using a release procedure including suspend configuration information (210). The above procedure transmits and receives one or more RRC messages between the UE and the base station, and is composed of one or more steps. Also, after resume, inactive mode can transition to idle mode by using a release procedure (220). Transitions between connected mode and idle mode follow the existing LTE technology. For example, through an establishment procedure or release procedure, the transition between these modes is made (225).

Figure 3:
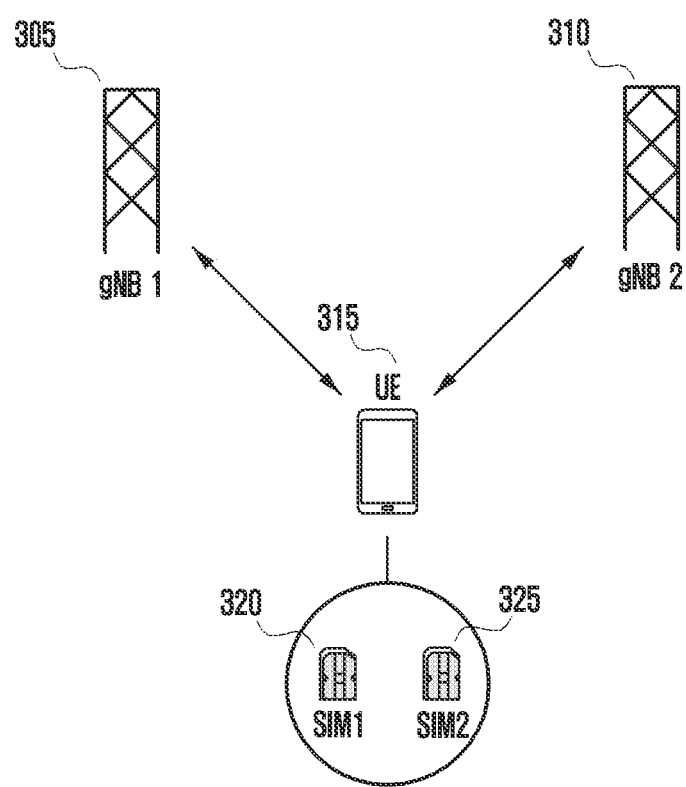
FIG. 3 is a diagram illustrating a UE supporting plural subscriber identity modules (SIMs) according to an embodiment of the disclosure.

FIG. 3 is a diagram illustrating a UE supporting plural subscriber identity modules (SIMs) according to an embodiment of the disclosure.

The SIM is a device in which information of a mobile communication subscriber is stored, and the UE uses the information stored in this device to register and connect to the network provided by the operator to which the subscriber subscribes. The multi-SIM UE 315 according to an embodiment of the disclosure is a UE supporting two or more SIMs 320 and 325 (e.g., first SIM 320 and second SIM 325). The multi-SIM UE may operate in first mode (hereinafter, dual SIM dual standby (DSDS) mode) or in second mode (hereinafter, dual SIM dual active (DSDA) mode). DSDS mode and DSDA mode may be defined as follows.

DSDS: both SIMs can be used for idle-mode network connection, but when a radio connection (305) is active the second connection (310) is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained.

DSDA: both SIMs can be used in both idle and connected modes. Each SIM has a dedicated transceiver, meaning that there are no interdependencies on idle or connected mode operation at the modem level.

In consideration of a multi-SIM UE supporting the first mode, the disclosure proposes methods that enable the UE to smoothly perform idle mode operation on the other network. The idle mode operation means paging monitoring and reception, system information reception, public warning system (PWS) information reception, tracking area update (TAU), and the like.

Figure 4:
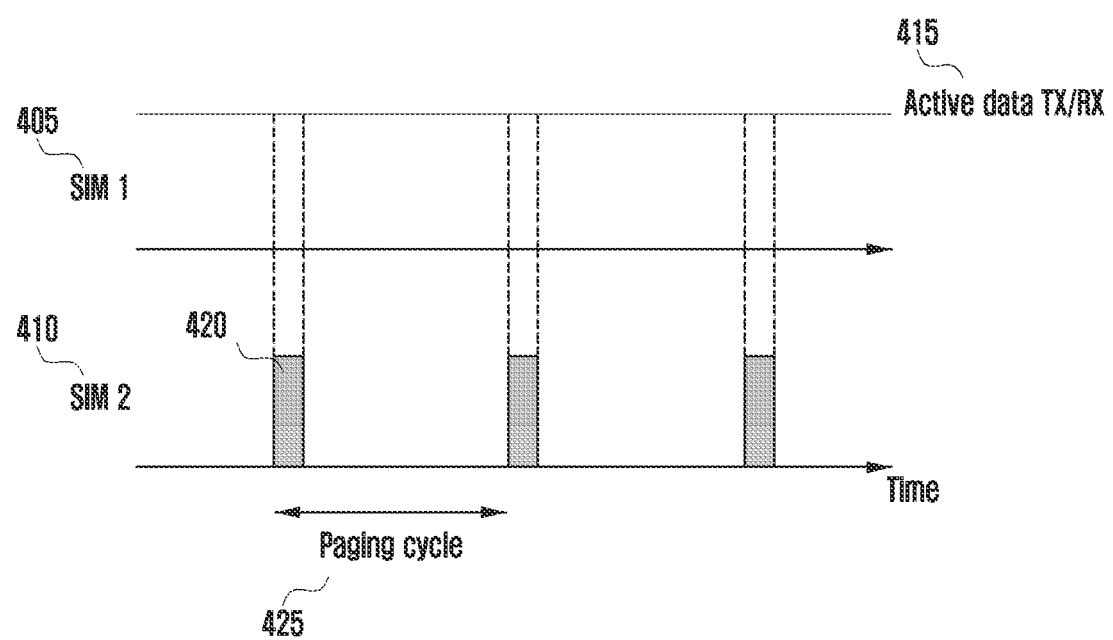
FIG. 4 is a diagram depicting a collision that occurs when a UE supporting plural SIMs transmits and receives data in connected mode on a first network associated with the first SIM and receives paging on a second network associated with the second SIM according to an embodiment of the disclosure.

FIG. 4 is a diagram depicting a collision that occurs when a UE supporting plural SIMs transmits and receives data in connected mode on a first network associated with the first SIM and receives paging on a second network associated with the second SIM according to an embodiment of the disclosure.

When the multi-SIM UE supporting the first mode is transmitting and receiving data in connected mode on the first network 405 corresponding to the first SIM (415), it may have difficulty in monitoring paging transmitted on the second network 410 corresponding to the second SIM (425) or performing other idle mode operations (430). If the UE has one receiver and receives downlink data on the first network, it cannot receive paging, system information, and PWS information transmitted on the second network. TAU is a process of re-registering a paging area periodically or when the UE reselects another cell with a different TA, and a network connection is required. Here, the UE needs a transmission and reception process with the network. Hence, the TAU operation cannot be performed depending on whether transmission and reception is performed on the other network.

To enable the multi-SIM UE to smoothly perform paging reception on the other network, the disclosure proposes a method for including service type information in a paging message and requesting the network in connected mode to release the connected mode.

Figure 5:
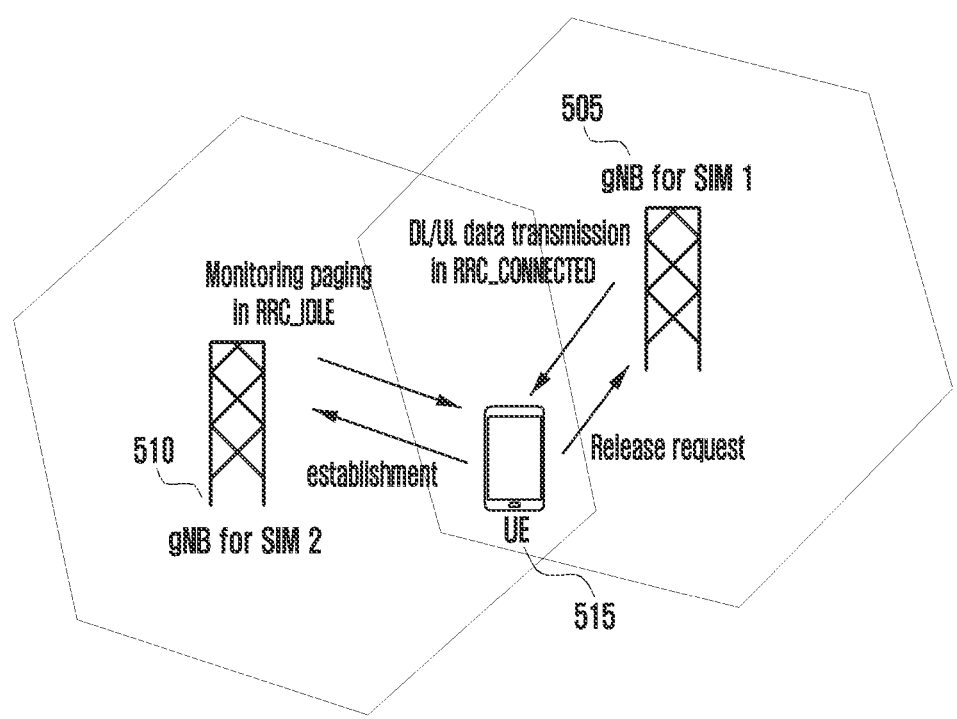
FIG. 5 is a diagram depicting a scenario in which a UE supporting plural SIMs transmits and receives data in connected mode on a first network associated with the first SIM and receives a paging message on a second network associated with the second SIM according to an embodiment of the disclosure.

FIG. 5 is a diagram depicting a scenario in which a UE supporting plural SIMs transmits and receives data in connected mode on a first network associated with the first SIM and receives a paging message on a second network associated with the second SIM according to an embodiment of the disclosure.

The UE 515 supporting multiple SIMs is transmitting and receiving data on the first network 505 corresponding to the first SIM 505 in connected mode. At this time, the UE may monitor paging on the second network 510 corresponding to the second SIM 510.

Upon receiving the paging, the UE should determine whether to continue data transmission and reception on the first network, or to release the RRC connection to the first network and establish an RRC connection to the second network in response to the received paging.

In this embodiment, in the next-generation mobile communication system, a service type indicator such as VoNR (VoLTE if LTE) is included in the paging message to facilitate the above determination of the UE. Here, to indicate the service type information, an efficient signaling format of ASN.1 is proposed. The service type may indicate another service other than VoNR. According to the UE determination, to release the RRC connection to the first network and to establish an RRC connection to the second network in response to the received paging, a method for the UE to make an RRC connection release request to the first network is proposed. Further, for the purpose of saving power consumed by the UE, a method of including an indicator indicating the service type in a short message or introducing a separate P-RNTI corresponding to the service type is proposed.

The disclosure is applicable not only to the next-generation mobile communication system NR but also to the LTE system.

Figure 6:
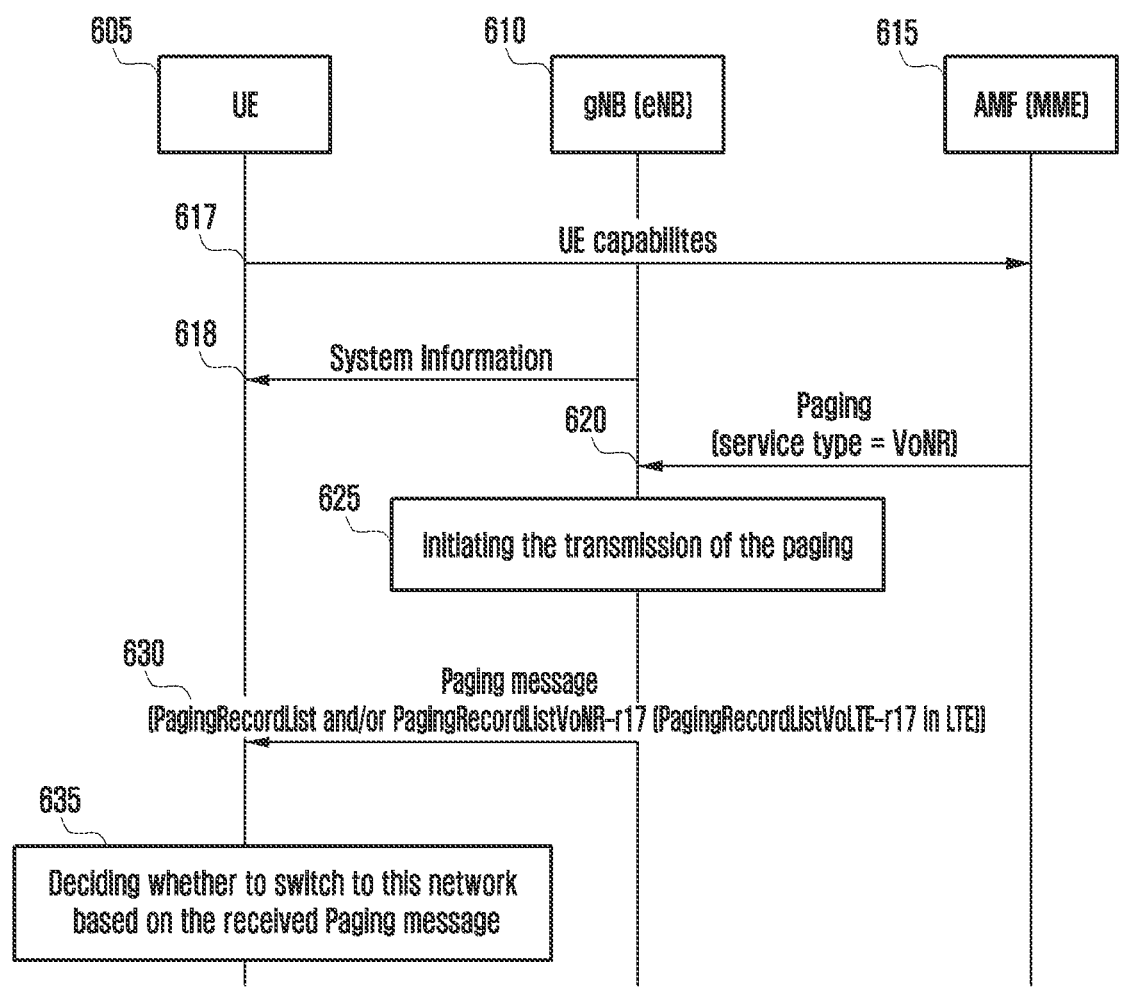
FIG. 6 is a sequence diagram of a process for performing a paging transmission operation according to an embodiment of the disclosure.

FIG. 6 is a sequence diagram of a process for performing a paging transmission operation according to an embodiment of the disclosure.

The disclosure is characterized in that the paging includes information indicating the type of service corresponding to the paging. In the present disclosure, VoNR may be considered as a service type in the next-generation mobile communication system NR. On the other hand, VoLTE may be considered as a service type in the LTE system. Although the contents in the disclosure mainly refer to VoNR or VoLTE, other service types can be applied by extension. For example, such a service may be a service that is determined to be sensitive to delay and to have high importance. The information in the paging may be used by the UE to determine whether to release the current connection to the RRC-connected network and to make an RRC connection to the network having transmitted the paging. In general, since the VoNR (or VoLTE) service is delay-sensitive and is considered to be of high importance from the user's point of view, if information indicating the VoNR service (or VoLTE service) is included in the paging, it will be useful for the UE to determine whether to switch the RRC connection.

The UE 605 may transmit its capability information to the AMF 615 (617). The capability information may include information indicating whether the UE supports multiple SIMs and whether the UE can receive a paging message including a service type. The terminal 605 may receive system information from the base station 610 (618). This system information may include an indicator indicating whether the base station 610 can transmit a paging message containing information indicating a service type. The AMF 615 may transmit a paging corresponding to VoNR to the base station 610 (620). The base station 610 may trigger transmission of the paging message (625). The paging may include information indicating a service type according to a specific format and may be transmitted to the UE (630). If the UE supports multiple SIMs, it should be able to decode the information indicating a service type. The disclosure is characterized in that information indicating the service type is included in the paging in the following format.

Option 1: introduce new pagingRecordList containing a paging record corresponding to a specific service (e.g., VoNR). (e.g., pagingRecordListVoNR)

When there are several specific service types, new pagingRecordList corresponding to each of the service types may be defined. For example, in the following ASN.1 structure, pagingRecordListVoNR, pagingRecordListServiceType1, pagingRecordListServiceType2, and pagingRecordListServiceType3 may be IEs containing paging records corresponding to VoNR, service type 1, service type 2, and service type 3, respectively.

If services of VoNR, service type 1, service type 2, and service type 3 are all triggered for the UE, a paging record corresponding to the UE may be contained in each of pagingRecordListVoNR, pagingRecordListServiceType1, pagingRecordListServiceType2, and pagingRecordListServiceType3.

The maximum number of paging records contained in a paging message is limited. Hence, if multiple services are triggered at the same time, the network may select a highest priority or delay-sensitive service, include a paging record associated with the selected service in the corresponding pagingRecordList, and transmit it to the UE. This selection method may be predefined in the standard or may be network implementation.

Existing pagingRecordList can still be used to accommodate the paging record of the service that does not correspond to new pagingRecordList.

If another service is triggered together with the VoNR service (the other service does not have corresponding new pagingRecordList), the network may include a paging record corresponding to the VoNR service for the UE and a paging record corresponding to the other service in new pagingRecordListVoNR and existing pagingRecordList, respectively.

If it is assumed that the network is not aware of the capability of the UE, the network may include a paging record corresponding to the VoNR service for the UE in both new pagingRecordListVoNR and existing pagingRecordList.

The UE must decode existing pagingRecordList regardless of whether it supports multiple SIMs. In option 1, no additional information is defined in the PagingRecord IE.

Table 1 below is an example of a paging message in option 1.

TABLE 1

Paging message in Option 1

```
-- ASN1START
-- TAG-PAGING-START
Paging : :=                          SEQUENCE {
    pagingRecordList                     PagingRecordList              OPTIONAL, -- Need N
    lateNonCriticalExtension             OCTET STRING                  OPTIONAL,
    nonCriticalExtension                 Paging-v17xy-IEaSEQUENCE{ }   OPTIONAL
}
Paging-V17xy-IEs : :=                SEQUENCE {
    pagingRecordListVoNR-r17             PagingRecordList              OPTIONAL, -- Need N
    pagingRecordListServiceType1-r17     Paging RecordList             OPTIONAL, -- Need N
    pagingRecordListServiceType2-r17     Paging RecordList             OPTIONAL, -- Need N
    pagingRecordListServiceType3-r17     Paging RecordList             OPTIONAL, -- Need N
    nonCriticalExtension                 SEQUENCE { }                  OPTIONAL
}
PagingRecordList : :=                SEQUENCE (SIZE (1 . .maxNrofPageRec) ) OF PagingRecord
PagingRecord : :=                    SEQUENCE {
    ue-Identity                          PagingUE-Identity,
    accessType                           ENUMERATED {non 3GPP}         OPTIONAL, -- Need N
    . . .
}
PagingUE-Identity : :=               CHOICE {
    ng-5G-S-TMSI                         NG-5G-S-TMSI,
    fullI-RNTI                           I-RNTI-Value,
    . . .
}
-- TAG-PAGING-STOP
-- ASN1STOP
```

Option 2: include an indicator corresponding to a specific service (e.g., VoNR) in each paging record.

When there are several specific service types, a new indicator may be defined for each service type. For example, in the following ASN.1 structure, vonr-Indication, serviceType1-Indication, serviceType2-Indication, and serviceType3-Indication are indicators corresponding to VoNR, service type 1, service type 2, and service type 3, respectively.

If all VoNR, service type 1, service type 2, and service type 3 services are triggered for the UE, all indicators corresponding respectively to the services may be included in the paging record corresponding to the UE.

The maximum number of paging records contained in a paging message is limited. Hence, if multiple services are triggered at the same time, the network may select a highest priority or delay-sensitive service, include an indicator corresponding to the selected service in the paging record, and transmit it to the UE. This selection method may be pre-defined in the standard or may be network implementation.

Those UEs that cannot decode the new indicator may ignore it.

Table 2 below is an example of a paging message in option 2.

TABLE 2

Paging message in Option 2

```
-- ASN1START
-- TAG-PAGING-START
Paging : :=                  SEQUENCE {
    pagingRecordList             PagingRecordList              OPTIONAL, -- Need N
    lateNonCriticalExtension     OCTET STRING                  OPTIONAL,
    nonCriticalExtension         SEQUENCE { }                  OPTIONAL
}
PagingRecordList : :=        SEQUENCE (SIZE (1 . .maxNrofPageRec) ) OF PagingRecord
PagingRecord : :=            SEQUENCE {
    ue-Identity                  PagingUE-Identity,
    accessType                   ENUMERATED {non3GPP}    OPTIONAL, -- Need N
    . . .
    [ [
    vonr-Indication-r17              ENUMERATED {TRUE}    OPTIONAL,    -- Need N
    serviceType1-Indication-r17      ENUMERATED {TRUE}    OPTIONAL,    -- Need N
    serviceType2-Indication-r17      ENUMERATED {TRUE}    OPTIONAL,    -- Need N
    serviceType3-Indication-r17      ENUMERATED {TRUE}    OPTIONAL     -- Need N
    ] ]
}
PagingUE-Identity : :=       CHOICE {
    ng-5G-S-TMSI                 NG-5G-8-TMSI,
    fullI-RNTI                   I-RNTI-Value,
```

TABLE 2-continued

Paging message in Option 2

```
    ...
}
-- TAG-PAGING-STOP
-- ASN1STOP
```

Option 3: include a cause value (pagingCause) indicating a specific service (e.g., VoNR) in each paging record.

When there are multiple specific services, the network may select a highest priority or delay-sensitive service, include a cause value corresponding to the selected service in the paging record, and transmit it to the UE. This selection method may be predefined in the standard or may be network implementation.

Those UEs that cannot decode the new cause field may ignore it.

Table 3 below is an example of a paging message in option 3.

At step 715, the UE may determine whether it supports multiple SIMs (or whether it can decode information indicating a service type included in a paging message).

If the UE supports multiple SIMs, at step 720, the UE can decode both existing pagingRecordList and new pagingRecordListVoNR to check whether a paging record for the UE is present.

If the UE does not support multiple SIMs, at step 725, the UE can decode only existing pagingRecordList to check whether a paging record for the UE is present.

At step 730, if the UE is in RRC connected state with the other network, the UE may determine whether to switch the

TABLE 3

Paging message in Option 3

```
-- ASN1START
-- TAG-PAGING-START
Paging : :=              SEQUENCE {
    pagingRecordList         PagingRecordList                                OPTIONAL, -- Need N
    lateNonCriticalExtension OCTET STRING                                    OPTIONAL,
    nonCriticalExtension     SEQUENCE { }                                    OPTIONAL
}
PagingRecordList : :=    SEQUENCE (SIZE(1 . .maxNrofPageRec) ) OF PagingRecord
PagingRecord : :=        SEQUENCE {
    ue-Identity             PagingUE-Identity,
    accessType              ENUMERATED {non3GPP}    OPTIONAL, -- Need N
    ...
    [ [
    pagingCause-r17           ENUMERATED {vonr, serviceType1, serviceType2,
                              serviceType3, spare4, spare3, spare2, spare1},  OPTIONAL -- Need N
    } }
}
PagingUE-Identity : :=   CHOICE {
    ng-5G-S-TMSI            NG-5G-S-TMSI ,
    fullI-RNTI              I-RNTI-Value,
    ...
}
-- TAG-PAGING-STOP
-- ASN1STOP
```

Upon receiving the paging message, if the UE is currently in RRC connection to the other network, the UE may determine whether to release the RRC connection to the other network and to make an RRC connection to the network having transmitted the paging message in consideration of the information indicating a service type included in the paging message (635).

Except for the VoNR service, the service type provided in the paging message may match a service type corresponding to an access category or a service type corresponding to an establishment cause.

Figure 7:
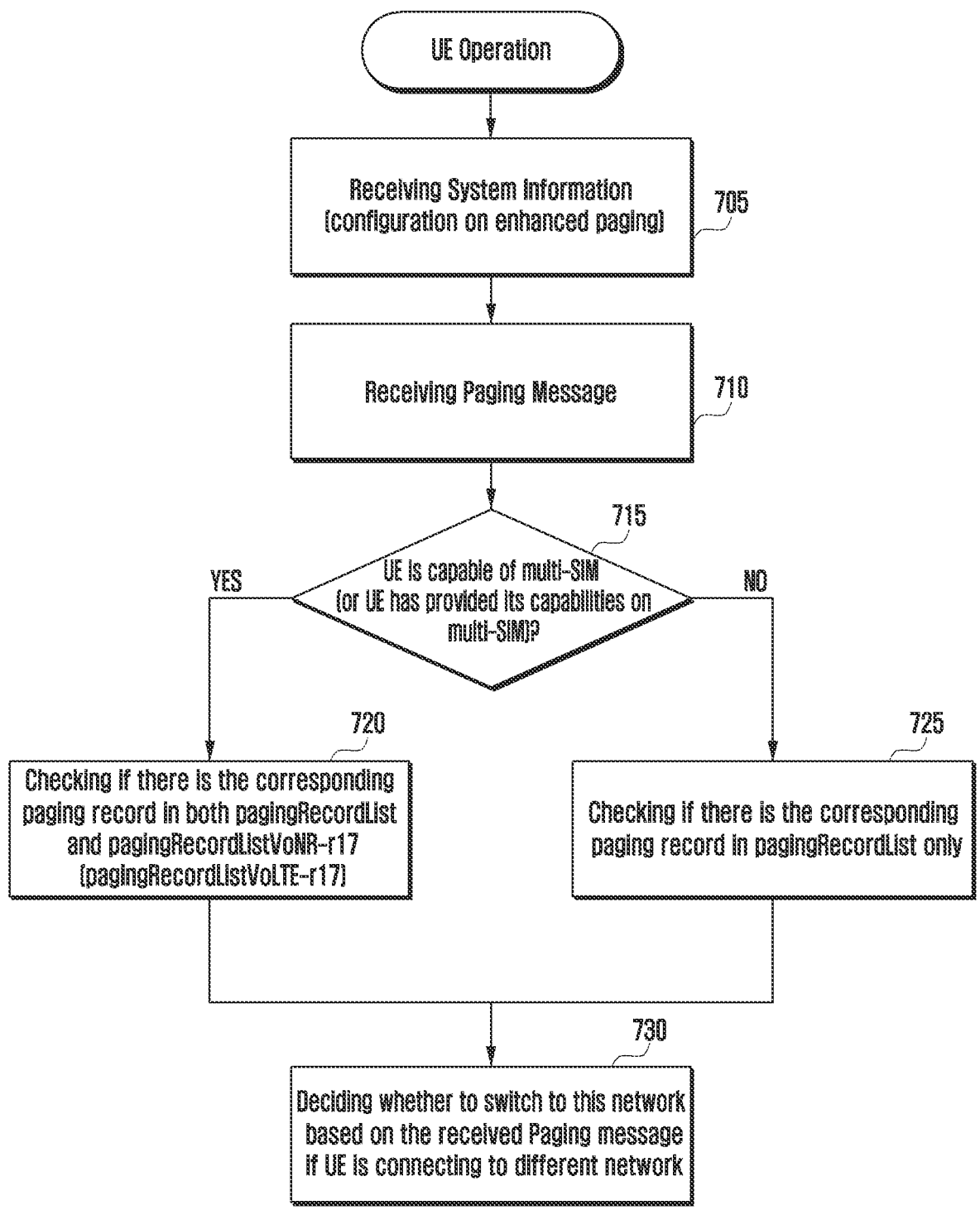
FIG. 7 is a flowchart of operations of a UE performing a paging reception operation according to an embodiment of the disclosure.

FIG. 7 is a flowchart of operations of a UE performing a paging reception operation according to an embodiment of the disclosure.

At step 705, the UE may receive system information from the base station. The system information may include an indicator indicating whether the base station can transmit a paging message containing information indicating a service type.

At step 710, the UE may receive a paging message from the base station.

RRC connection in consideration of the service information contained in the paging message. For example, the UE may determine whether to maintain the RRC connection to the other network or to make an RRC connection to the network having transmitted the paging message. If it is not in RRC connected state with the other network, according to the paging message, the UE may establish an RRC connection to the network having transmitted the paging message.

Figure 8:
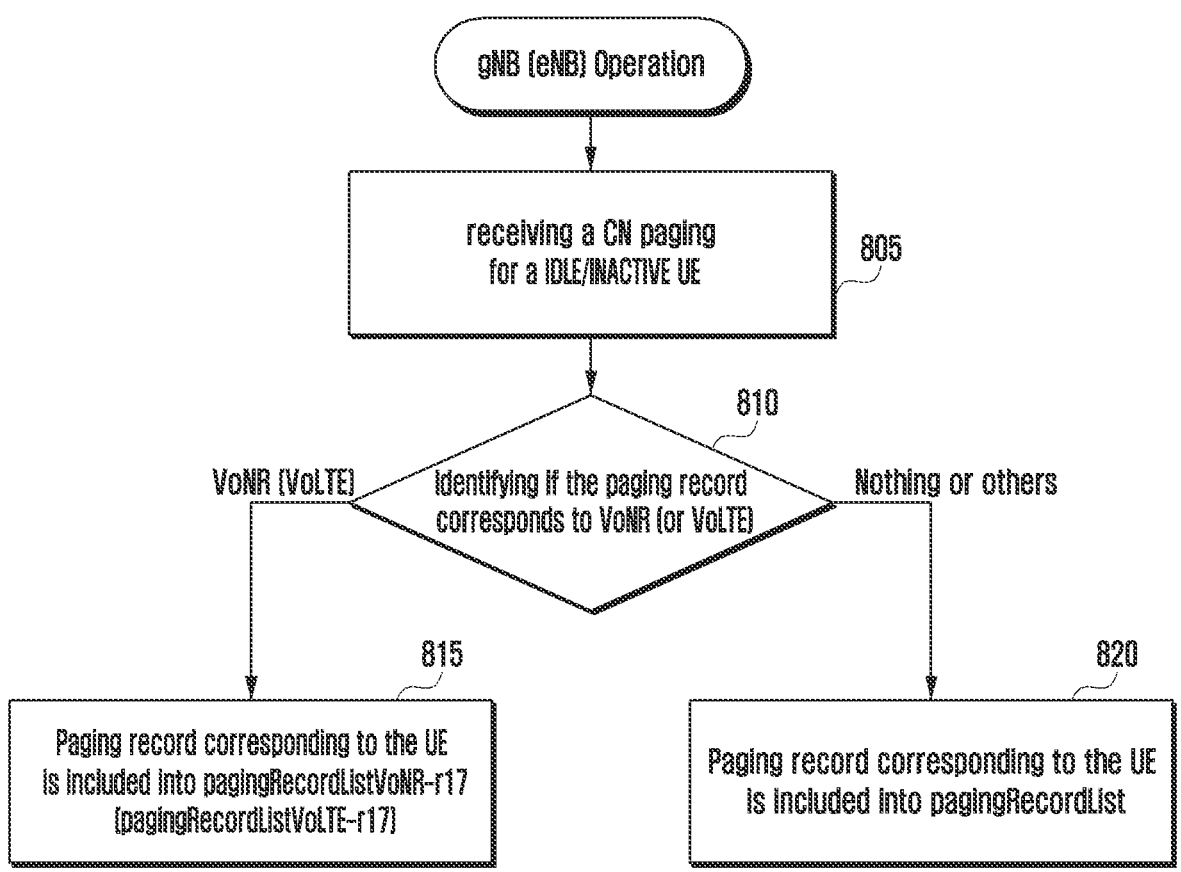
FIG. 8 is a flowchart of operations of a base station performing a paging transmission operation according to an embodiment of the disclosure.

FIG. 8 is a flowchart of operations of a base station performing a paging transmission operation according to an embodiment of the disclosure.

At step 805, the NR base station may receive a paging for the idle mode or inactive mode UE from the AMF. If it is an LTE base station, it may receive a paging from the MME.

At step 810, the base station may determine whether the paging is associated with a VoNR service. If the base station is an LTE base station, it may determine whether the paging is associated with a VoLTE service.

If the paging is associated with a VoNR service, at step 815, the base station may include a paging record in new pagingRecordListVoNR. According to another embodiment, the base station may include an indicator corresponding to VoNR in the paging record. On the other hand, according to another embodiment, the base station may include a cause value (pagingCause) indicating VoNR in the paging record.

If the paging is not associated with a VoNR service, at step 820, the base station may include a paging record in existing pagingRecordList.

Figure 9:
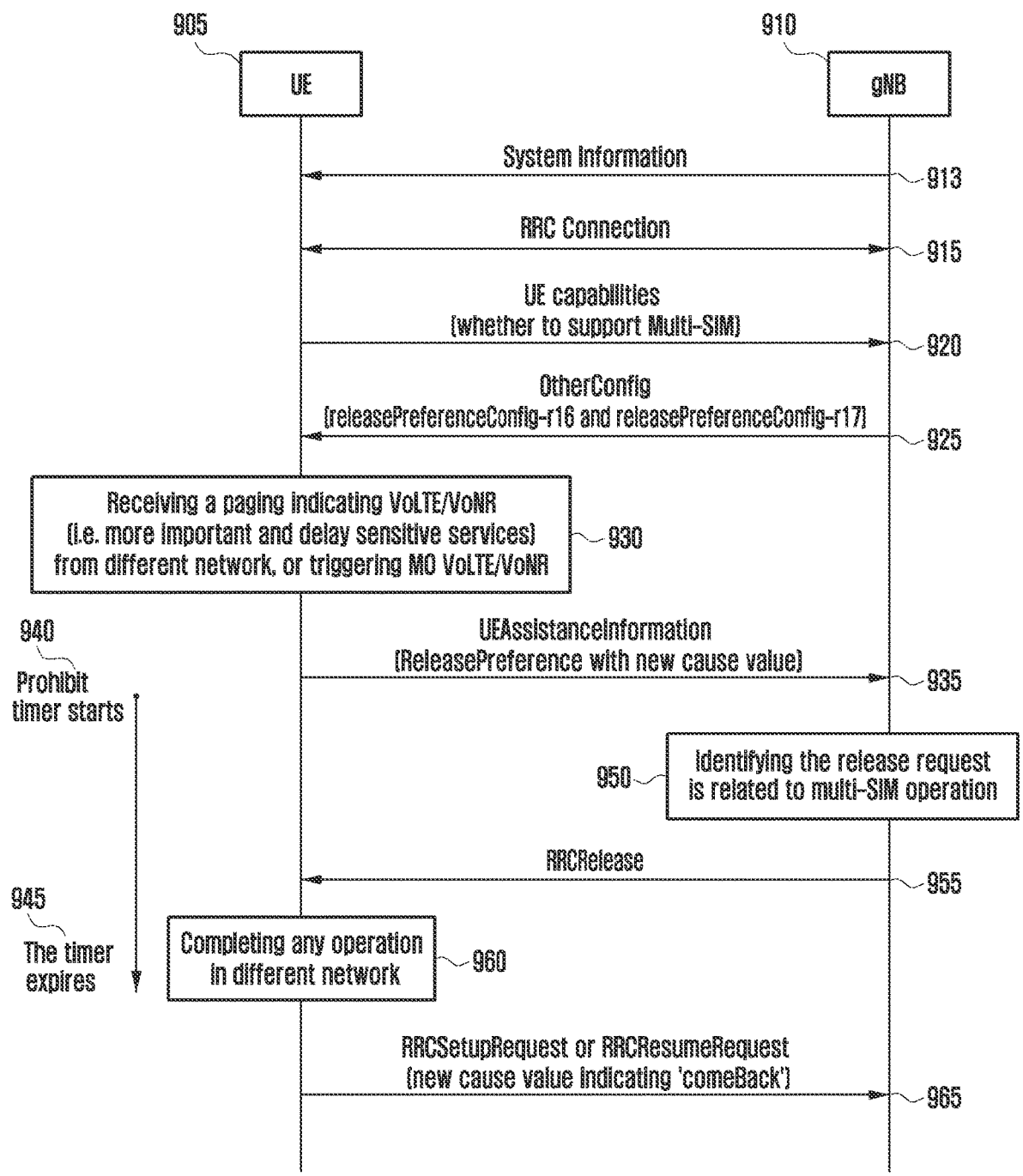
FIG. 9 is a flowchart of a process for requesting release of the current RRC connection to establish an RRC connection to the other network according to an embodiment of the disclosure.

FIG. 9 is a flowchart of a process for requesting release of the current RRC connection to establish an RRC connection to the other network according to an embodiment of the disclosure.

The first base station 910 corresponding to the first SIM may transmit capability information indicating that it supports multi-SIM UEs to the UE by broadcasting system information (913). In this embodiment, the capability information implies that a paging message including service information can be transmitted.

The UE 905 connects to the first base station 910 corresponding to the first SIM and receives a data service (915). The first base station 910 may obtain capability information of the UE 905 from the AMF. In addition, when the first base station 910 fails to obtain capability information of the UE 905 from the AMF, it may receive capability information of the UE 905 directly from the UE 905 (920). The capability information of the UE 905 may include information indicating that it supports multiple SIMs. In addition, the capability information of the UE 905 may include information indicating whether dual RX and dual TX can be supported. If there is no information about dual RX or dual TX support, the UE may be considered as supporting single RX or single TX. Further, information indicating whether to support the operation of releasing RRC connected mode proposed in this embodiment may be separately reported.

The base station 910 may provide configuration information required by the UE 905 to request the above operation by using a specified IE (OtherConfig) of a specific RRC message (RRCReconfiguration) (925). A new field releasePreferenceConfig-r17 may be proposed separately from existing field releasePreferenceConfig-r16. This new field may be used to indicate that the UE 905 can make a request for RRC connection to the other network in a multi-SIM environment. Upon receiving this field, the UE 905 may also report a cause value indicating that the reason for requesting RRC connection release is to make an RRC connection to the other network in a multi-SIM environment. The configuration information may also include the following information.

Prohibit timer: a timer for limiting frequent requests. When the UE reports the above request, this timer is started. The UE cannot transmit the request again until this timer expires.

Instead of the prohibit timer, the prohibit timer configuration information provided in legacy releasePreferenceConfig-r16 may be used.

The UE 905 may receive a paging message indicating a VoNR (VoLTE if the second base station is LTE) service from the second base station corresponding to the second SIM, or the UE 905 may itself trigger a mobile-originated (MO) VoNR service according to a user's request (930).

As above-described, the paging message received from the second base station may include information such as new pagingRecordList containing a paging record corresponding to a specific service (e.g., VoNR), an indicator corresponding to a specific service (e.g., VoNR) for each paging record, or a cause value (pagingCause) indicating a specific service (e.g., VoNR) for each paging record. Based on this information, the UE 905 can be aware that the paging message indicates a service such as VoNR.

The UE 905 may transmit a UEAssistanceInformation message containing releasePreference to the first base station 910 corresponding to the first SIM currently in connected state (935). The ASN.1 structure of existing releasePreference may be as shown in Table 4 below.

TABLE 4

ReleasePreference-r16 : := SEQUENCE {
    preferredRRC-State-r16    ENUMERATED {idle, inactive, connected, outOfConnected}
}

Using the above IE, the UE 905 may request to transition from current connected mode to idle mode or inactive mode, or may request to release the connected mode regardless of idle mode or inactive mode. In addition, even when a transition from connected mode is requested, if the prohibit timer is not running, the UE 905 may use the IE (using 'outOfConnected' value) to cancel it. The disclosure is characterized in that a cause value indicating the reason why the UE makes a connected mode release request is reported together with the IE. For example, when the UE 905 sends a connected mode release request to make an RRC connection to the other network, the UE 905 may also report the 'connectedToOther' value below. In addition to the above value, as a specific idle mode operation is required on the other network, cause values such as indicating a connected mode release request may be proposed as shown in Table 5 below.

TABLE 5

ReleasePreference-v17xy : :=    SEQUENCE {
  releaseCause-r17    ENUMERATED {connectedToOther, spare3, spare2, spare}
  OPTIONAL -- Need N
}

Whether the base station 910 having received the connected mode release request releases the connected mode and whether to actually transmit an RRCRelease message according to the connected mode release request is base station implementation. Therefore, it is important to accurately inform the base station 910 of the reason why the UE 905 makes a release request. This is because the base station 910 will determine whether to release the RRC connection according to the release cause.

After transmitting the UEAssistanceInformation message containing the releasePreference IE, the terminal 905 may start the prohibit timer (940). Until the timer expires (945), the UE 905 cannot transmit the releasePreference IE to the base station 910.

Upon receiving the releasePreference IE, the base station 910 may be aware that the UE 905 has made the release request to establish an RRC connection to the other network, and determine whether to transmit an RRCRelease message (950). The base station 910 may transmit an RRCRelease message to the UE 905 (955).

Upon receiving the RRCRelease message, the UE 905 may release the connection to the base station 910 and make an RRC connection to the other base station to perform a necessary operation (960). Thereafter, the UE 905 may attempt to reconnect to the first base station 910 to which it has been previously RRC-connected. Here, the UE 905 may use a new value (e.g., 'comeBack' value) indicating the situation as an establishment cause or resume cause value of an RRCSetupRequest or RRCResumeRequest message (965). Upon receiving this cause value, the base station 910 may allow the access of the UE 905 in consideration of service continuity in the previous RRC connection.

Figure 10:
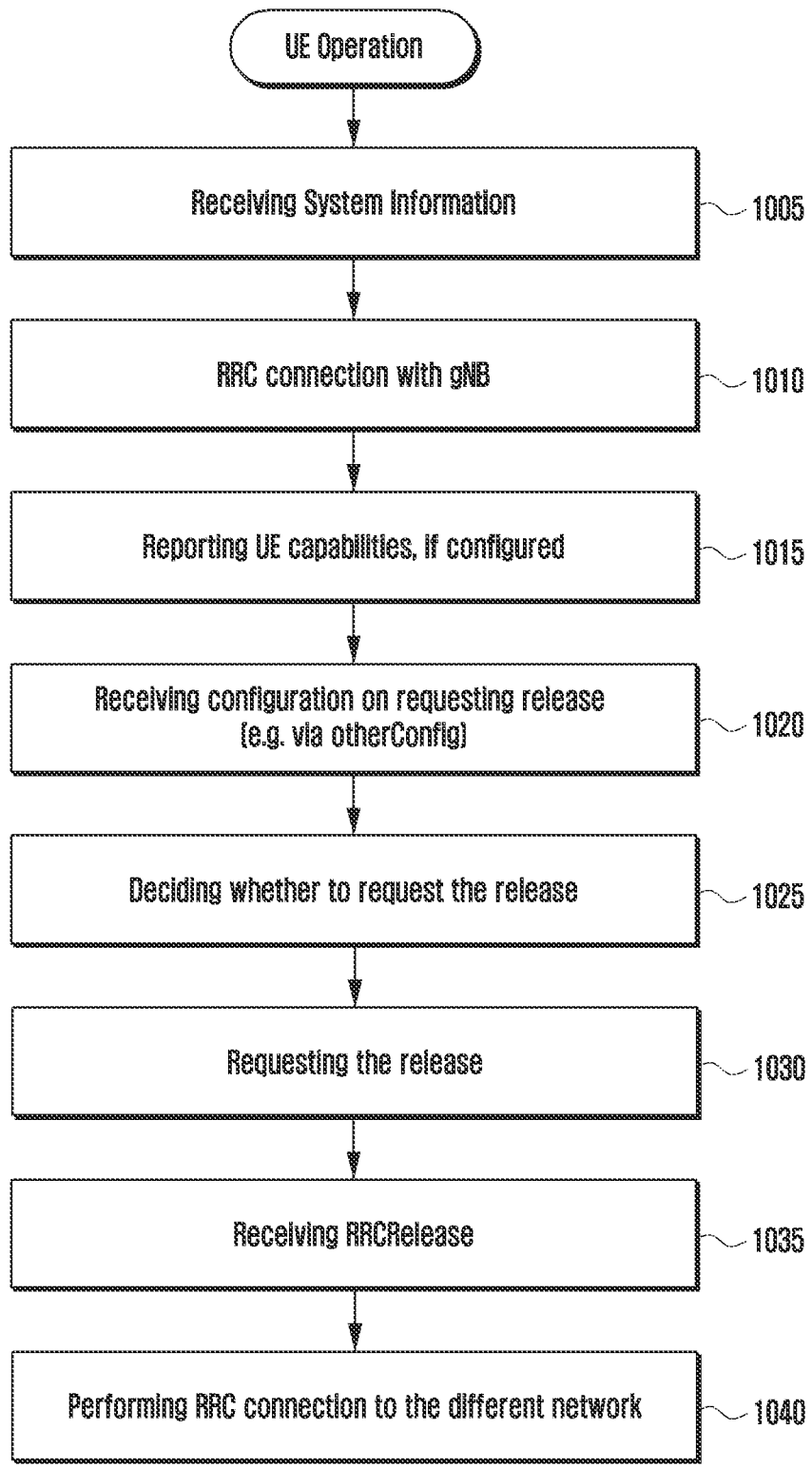
FIG. 10 is a flowchart of operations of a UE that requests release of the current RRC connection to establish an RRC connection to the other network according to an embodiment of the disclosure.

FIG. 10 is a flowchart of operations of a UE that requests release of the current RRC connection to establish an RRC connection to the other network according to an embodiment of the disclosure.

At step 1005, the UE may receive system information from the base station. This system information may include capability information indicating that the base station supports a multi-SIM UE.

At step 1010, the UE may connect to the base station through an establishment operation or a resume operation.

At step 1015, the UE may report its capability information to the base station according to the base station configuration. The capability information of the UE may include information indicating support of multiple SIMs.

At step 1020, the UE may receive configuration information required by the UE to request an RRC connection release operation through a specific IE (OtherConfig) of a designated RRC message (RRCReconfiguration).

At step 1025, to perform a specific idle or connected mode operation on the second network corresponding to the second SIM in idle mode (or inactive mode), the UE may determine whether the RRC connection needs to be released from the first network corresponding to the first SIM in connected mode.

At step 1030, the UE may request the base station to release the RRC connection through a specific RRC message. This request may include a cause value indicating that it is triggered because a specific idle or connected mode operation is required on the other network.

At step 1035, the UE may receive configuration information for RRC connection release from the base station through a specific RRC message.

At step 1040, the UE may perform a specific idle or connected mode operation on the second network corresponding to the second SIM.

Figure 11:
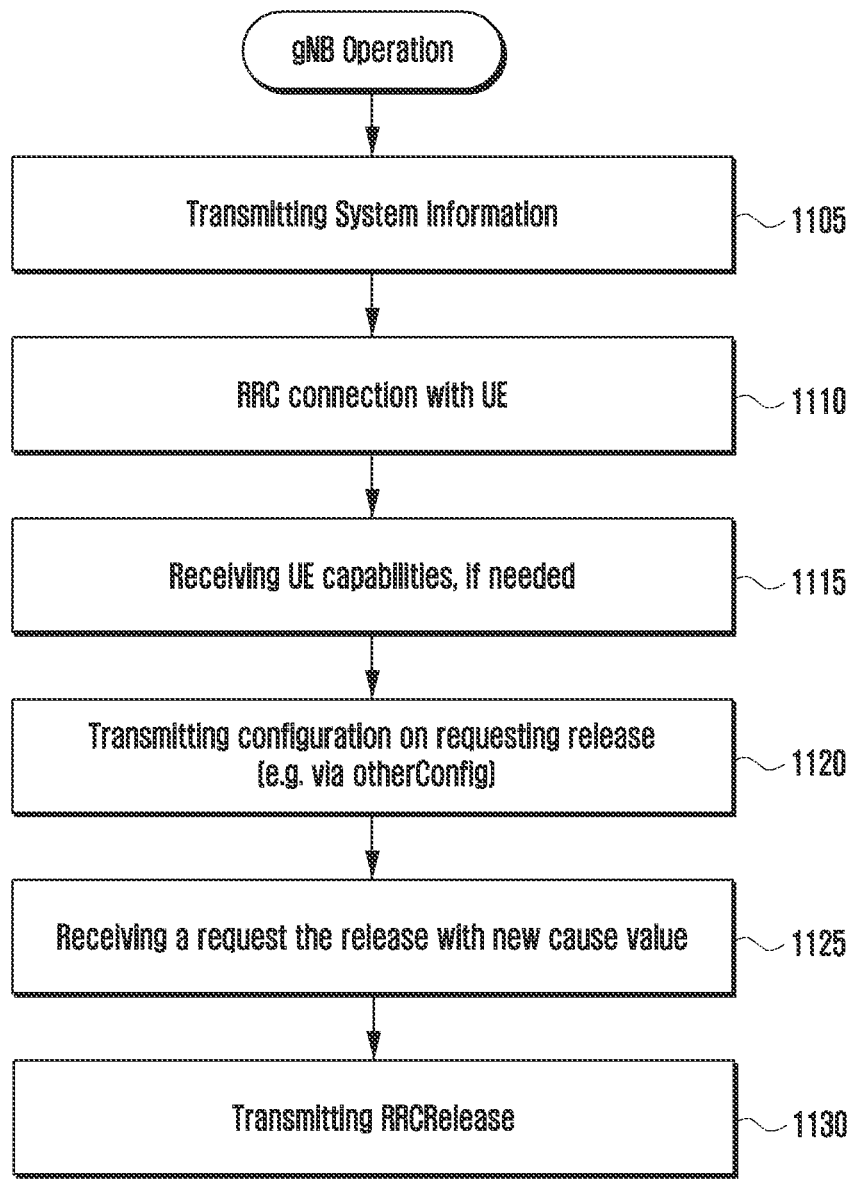
FIG. 11 is a flowchart of operations of a base station that requests release of the current RRC connection to establish an RRC connection to the other network according to an embodiment of the disclosure.

FIG. 11 is a flowchart of operations of a base station that requests release of the current RRC connection to establish an RRC connection to the other network according to an embodiment of the disclosure.

At step 1105, the base station may broadcast system information including capability information indicating that it supports a multi-SIM terminal.

At step 1110, the base station may be connected to a specific UE through an establishment operation or a resume operation.

At step 1115, when the base station cannot obtain capability information of the UE from the AMF, it may make a direct request to the UE to receive the capability information from the UE.

At step 1120, the base station may transmit configuration information necessary for requesting the RRC connection release operation to the UE through a specific IE (OtherConfig) of a designated RRC message (RRCReconfiguration).

At step 1125, the base station may receive an RRC connection release request from the UE through a specific RRC message. Here, the UE may report a cause value indicating the reason for requesting connected mode release together with releasePreference. For example, when the UE makes a connected mode release request to establish an RRC connection to the other network, the UE 905 may report the 'connectedToOther' value together with releasePreference.

At step 1130, the base station may transmit configuration information for RRC connection release to the UE through a specific RRC message.

Figure 12:
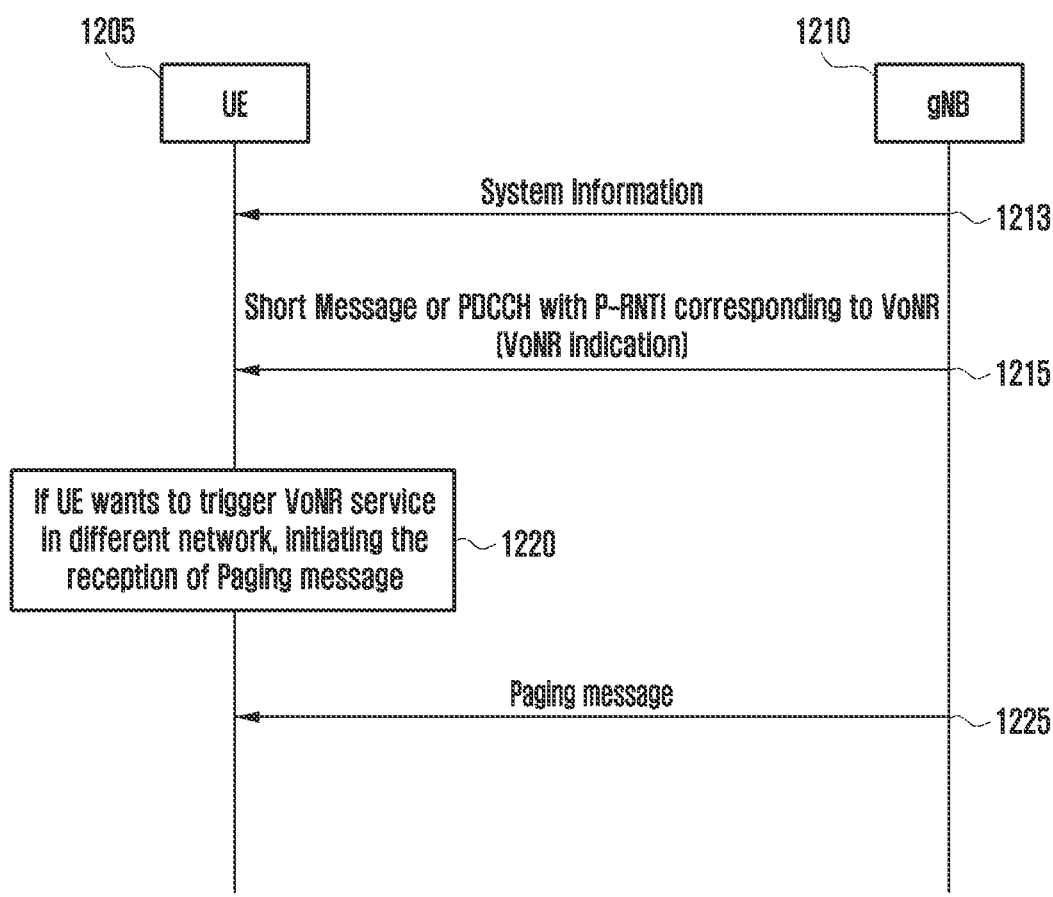
FIG. 12 is a sequence diagram of a process of including an indicator indicating the service type in a short message or utilizing a separate P-RNTI corresponding to the service type according to an embodiment of the disclosure.

FIG. 12 is a sequence diagram of a process of including an indicator indicating the service type in a short message or utilizing a separate P-RNTI corresponding to the service type according to an embodiment of the disclosure.

Receiving the paging message causes the UE to consume power. In a multi-SIM environment, while the UE connects to a first network and is performing data transmission and reception, it may receive a paging message containing a paging record corresponding to a specific service from a second network. If the UE will not switch to the second network except for a specific service considered important, there is no need for the UE to receive a paging message that does not include a paging record corresponding to the specific service. Accordingly, to enable the UE to determine whether to receive a paging message, the disclosure proposes to include an indicator indicating a specific service in a short message or to introduce a separate P-RNTI corresponding to the specific service.

A short message is L1 signaling accommodated in DCI format 1_0, and may be indicated by a P-RNTI and be transmitted on the PDCCH. As shown in Table 6 below, a short message is composed of a total of 8 bits, where the first bit may be used for SI update notification, the second bit may be used for ETWS/CMAS notification, and the third bit may be used to indicate whether it is necessary to receive a corresponding paging message. The remaining 5 bits may be reserved bits.

TABLE 6

| Bit | Short Message |
|---|---|
| 1 | systemInfoModification<br>If set to 1: indication of a BCCH modification other than SIB6, SIB7 and SIB8. |

TABLE 6-continued

| Bit | Short Message |
|---|---|
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE if received. |

According to an embodiment, some of the reserved bits may be used to indicate whether a paging record associated with a specific service is present in a paging message corresponding to the short message. For example, if a paging record corresponding to a VoNR service is included in the paging message, a bit indicating this may be included in the corresponding short message. Other specific services may also be indicated, and a total of five specific services may be indicated in consideration of the total number of reserved bits.

Another method is to introduce a separate P-RNTI corresponding to a specific service. Currently, a single P-RNTI is used and may be used to indicate scheduling information of the short message and the paging message. For example, a separate P-RNTI (P-VoNR-RNTI) corresponding to a specific service (VoNR service) may be used to indicate whether a paging record corresponding to VoNR is included in a legacy paging message, or to indicate a separate new paging message containing only a paging record corresponding to a specific service (VoNR service). A plurality of new P-RNTIs may be introduced according to the number of specific services.

Another method is to introduce a new separate short message indicating whether a paging record corresponding to specific services is included in the paging message. The short message may be indicated by the legacy P-RNTI or a new P-SERVICE-RNTI, and each bit of the short message may be used to indicate whether a paging record associated with a specific service is included in the paging message corresponding to the short message.

Therefore, according to the above embodiment, the sequence diagram is as follows when VoNR is taken into consideration.

The base station 1210 may transmit an indicator indicating whether it supports the above solution (e.g., transmission of a short message including a VoNR indicator or transmission of a separate P-RNTI corresponding to VoNR) to the UE through system information (1213). The UE 1205 supporting multiple SIMs and currently in connected mode on one network may receive a short message including a VoNR indicator or a separate P-RNTI corresponding to VoNR from the base station 1210 (1215). If the UE wants to receive the VoNR service, it may trigger reception of a paging message (1220). The UE may receive a corresponding paging message (1225).

Figure 13:
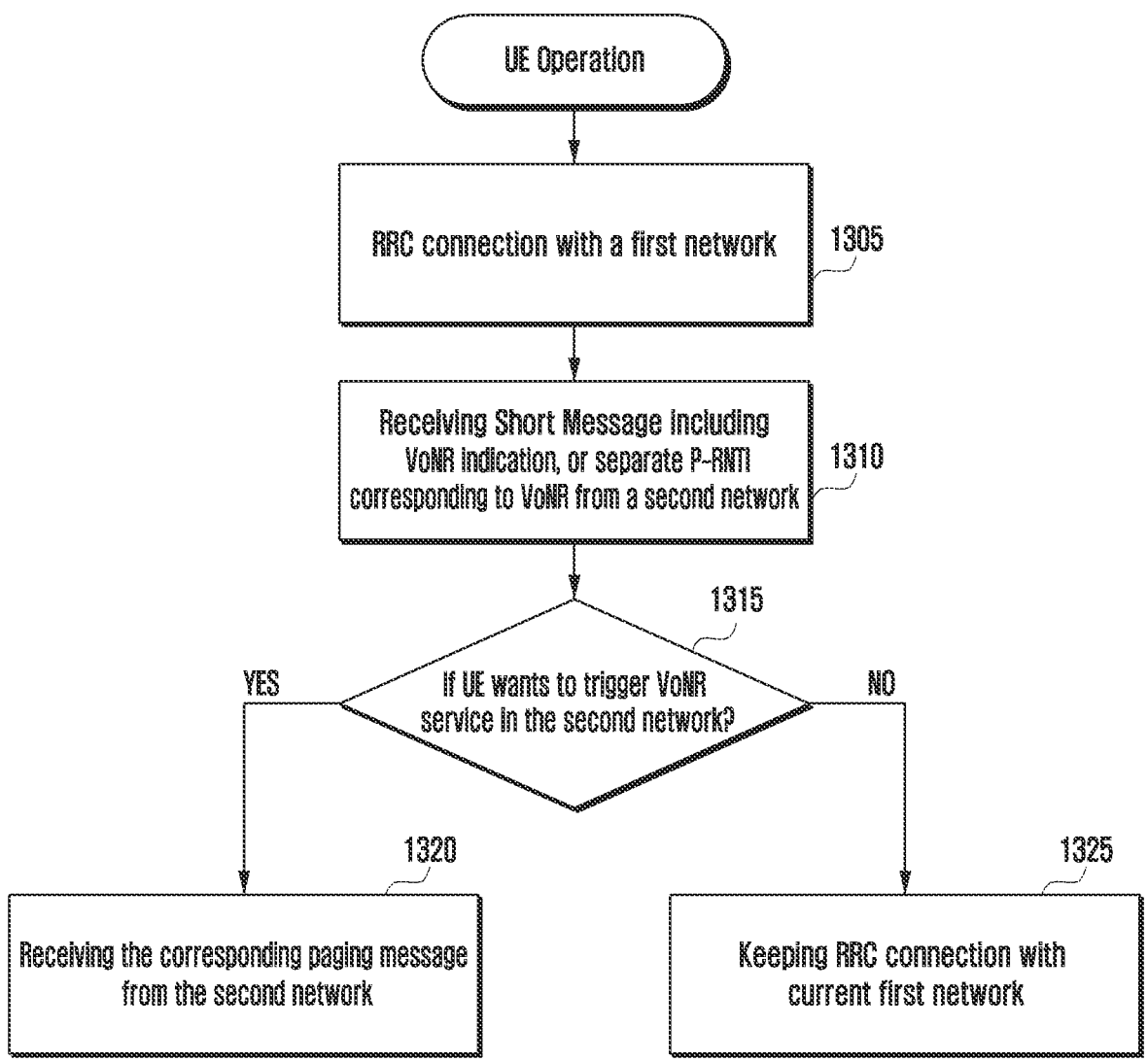
FIG. 13 is a flowchart of operations of a UE that includes an indicator indicating the service type in a short message or utilizes a separate P-RNTI corresponding to the service type according to an embodiment of the disclosure.

FIG. 13 is a flowchart of operations of a UE that includes an indicator indicating the service type in a short message or utilizes a separate P-RNTI corresponding to the service type according to an embodiment of the disclosure.

At step 1305, the UE may receive a data service in RRC connected state on the first network.

At step 1310, the UE may receive a short message including a VoNR indicator or a separate P-RNTI corresponding to VoNR from the second network.

At step 1315, the UE may determine whether it wants to receive the VoNR service from the second network.

If the UE wants to receive the VoNR service, at step 1320, it may receive a corresponding paging message.

If the UE does not want to receive the VoNR service, at step 1325, it may continue transmitting and receiving data on the first network without receiving a corresponding paging message.

Figure 14:
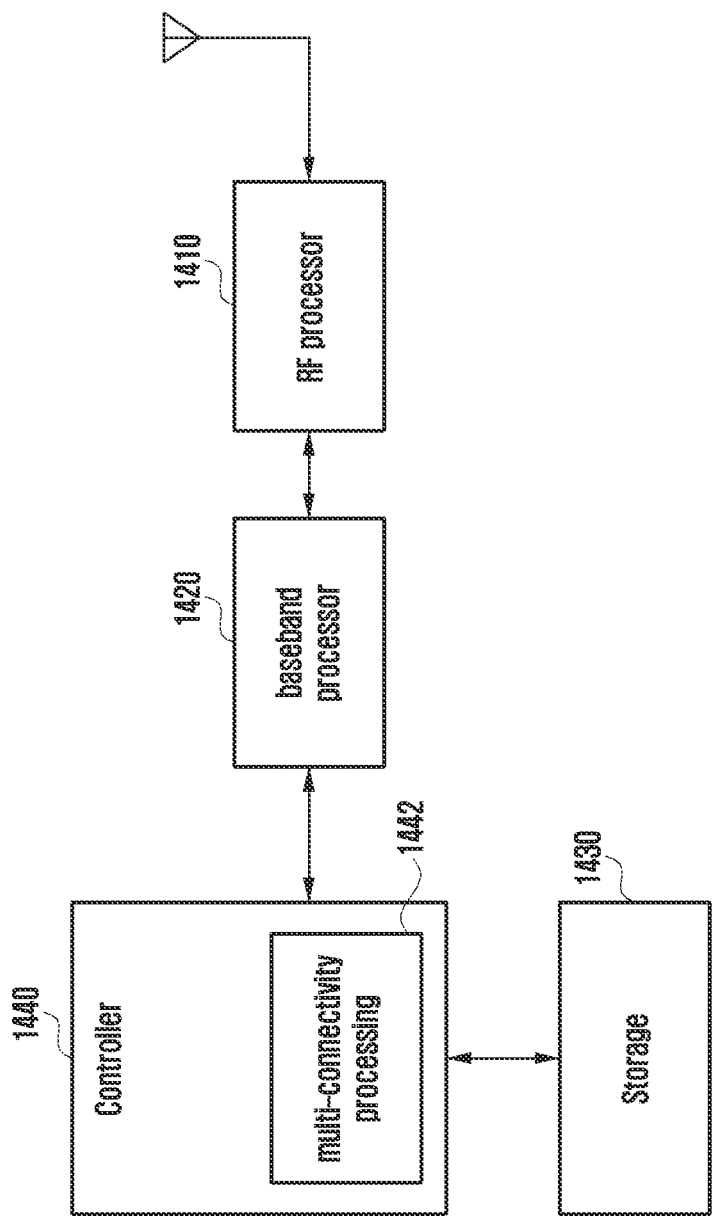
FIG. 14 is a block diagram illustrating the internal structure of a UE according to an embodiment of the disclosure.

FIG. 14 is a block diagram illustrating the internal structure of a UE according to an embodiment of the disclosure.

With reference to the drawing, the UE may include a radio frequency (RF) processor 1410, a baseband processor 1420, a storage 1430, and a controller 1440.

The RF processor 1410 may perform a function for transmitting and receiving a signal through a radio channel, such as signal band conversion and amplification. For example, the RF processor 1410 may perform up-conversion of a baseband signal provided from the baseband processor 1420 into an RF-band signal and transmit it through an antenna, and may perform down-conversion of an RF-band signal received through an antenna into a baseband signal. The RF processor 1410 may include a transmission filter, a reception filter, an amplifier, a mixer, an oscillator, a digital-to-analog converter (DAC), and an analog-to-digital converter (ADC). Although only one antenna is illustrated in FIG. 14, the UE may be provided with a plurality of antennas. Also, the RF processor 1410 may include a plurality of RF chains. Further, the RF processor 1410 may perform beamforming. For beamforming, the RF processor 1410 may adjust phases and magnitudes of signals transmitted and received through plural antennas or antenna elements. In addition, the RF processor may perform MIMO, and may receive multiple layers while performing MIMO operation.

The baseband processor 1420 performs conversion between a baseband signal and a bit stream in accordance with the physical layer specification of the system. For example, during data transmission, the baseband processor 1420 generates complex symbols by encoding and modulating a transmission bit stream. Further, during data reception, the baseband processor 1420 reconstructs a reception bit stream by demodulating and decoding a baseband signal provided from the RF processor 1410. For example, in the case of utilizing orthogonal frequency division multiplexing (OFDM), for data transmission, the baseband processor 1420 generates complex symbols by encoding and modulating a transmission bit stream, maps the complex symbols to subcarriers, and composes OFDM symbols through inverse fast Fourier transform (IFFT) operation and cyclic prefix (CP) insertion. Further, for data reception, the baseband processor 1420 divides a baseband signal provided from the RF processor 1410 in units of OFDM symbols, restores the signals mapped to subcarriers through fast Fourier transform (FFT) operation, and reconstructs the reception bit stream through demodulation and decoding.

The baseband processor 1420 and the RF processor 1410 transmit and receive signals as described above. Hence, the baseband processor 1420 and the RF processor 1410 may be called a transmitter, a receiver, a transceiver, or a communication unit. Further, to support different radio access technologies, at least one of the baseband processor 1420 or the RF processor 1410 may include a plurality of communication modules. In addition, to process signals of different frequency bands, at least one of the baseband processor 1420 or the RF processor 1410 may include different communication modules. For example, the different radio access technologies may include a wireless LAN (e.g., IEEE 802.11), a cellular network (e.g., LTE), and the like. In addition, the different frequency bands may include a super high frequency (SHF) band (e.g., 2.NRHz, NRhz) and a millimeter wave (mmWave) band (e.g., 60 GHz).

The storage 1430 stores data such as basic programs, application programs, and configuration information for the operation of the UE. In particular, the storage 1430 may store information related to a second access node that performs wireless communication using a second radio access technology. The storage 1430 provides stored data in response to a request from the controller 1440.

The controller 1440 controls the overall operation of the UE. For example, the controller 1440 transmits and receives signals through the baseband processor 1420 and the RF processor 1410. Further, the controller 1440 writes or reads data to or from the storage 1440. To this end, the controller 1440 may include at least one processor. For example, the controller 1440 may include a communication processor (CP) for controlling communication and an application processor (AP) for controlling upper layers such as application programs.

According to an embodiment, the controller 1440 may be configured to control, while the UE is in connected state with a first base station of a first network corresponding to the first SIM, the transceiver to receive a paging message including information indicating a specific service from a second base station of a second network corresponding to the second SIM, determine whether to release the connection to the first network and to connect to the second network based on the paging message, and control the transceiver to transmit a connection release request message including information on a release cause to the first base station based on the determination result.

The connection release request message may be a radio resource control (RRC) message.

The information on a release cause included in the connection release request message may indicate that the UE intends to connect to the second network corresponding to the second SIM.

The specific service may be a VoNR service when the second network is NR, and a VoLTE service when the second network is E-UTRA.

The controller 1440 may control the transceiver to transmit capability information indicating that the UE supports multiple SIMs to the first base station before receiving the paging message.

Figure 15:
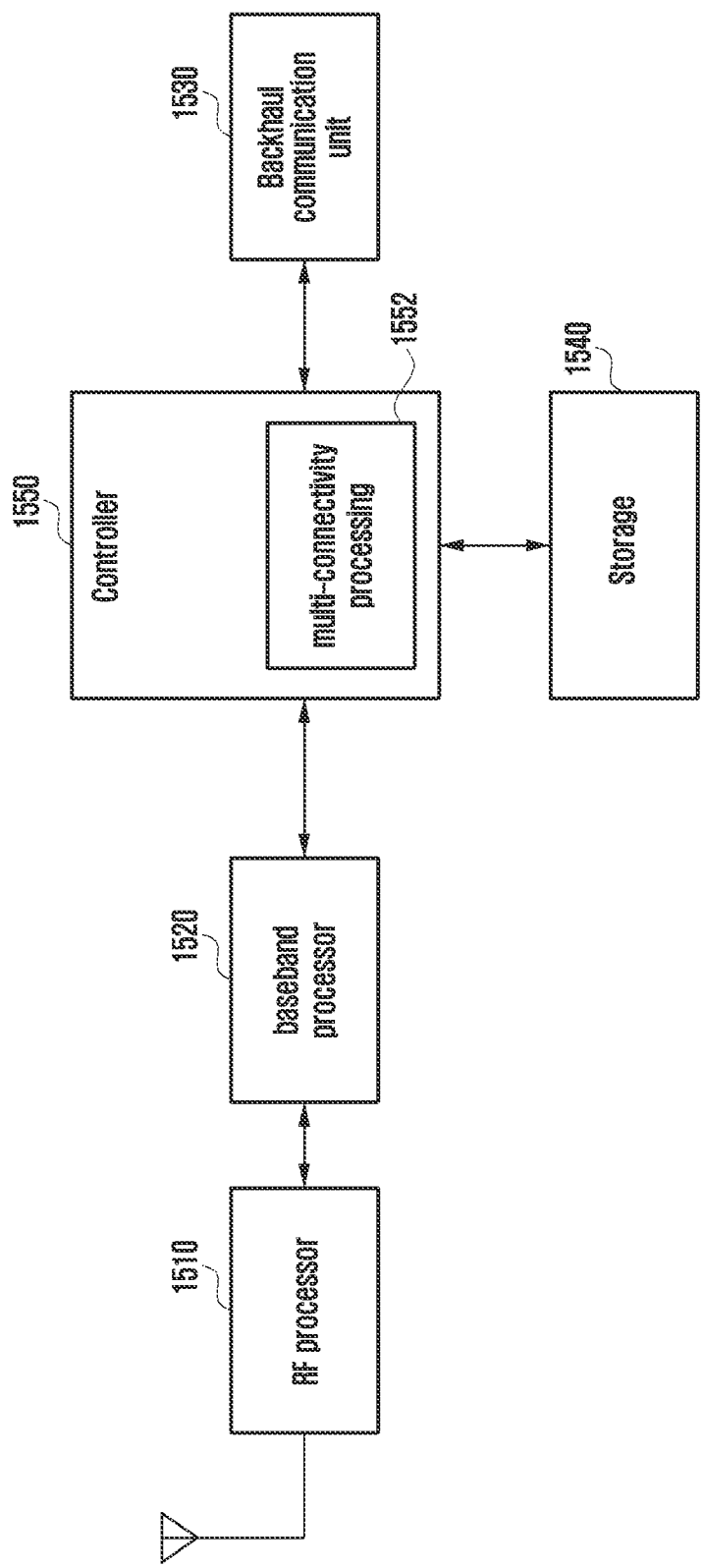
FIG. 15 is a block diagram illustrating the structure of a base station according to an embodiment of the disclosure.

FIG. 15 is a block diagram illustrating the structure of a base station according to an embodiment of the disclosure.

As shown in the drawing, the base station includes an RF processor 1510, a baseband processor 1520, a backhaul communication unit 1530, a storage 1540, and a controller 1550.

The RF processor 1510 performs a function for transmitting and receiving a signal through a radio channel, such as signal band conversion and amplification. That is, the RF processor 1510 performs up-conversion of a baseband signal provided from the baseband processor 1520 into an RF-band signal and transmits the converted signal through an antenna, and performs down-conversion of an RF-band signal received through an antenna into a baseband signal. For example, the RF processor 1510 may include a transmission filter, a reception filter, an amplifier, a mixer, an oscillator, a DAC, and an ADC. Although only one antenna is illustrated in the drawing, the first access node may be provided with a plurality of antennas. Additionally, the RF processor 1510 may include a plurality of RF chains. Further, the RF processor 1510 may perform beamforming. For beamforming, the RF processor 1510 may adjust phases and amplitudes of signals transmitted and received through plural antennas or antenna elements. The RF processor may perform downlink MIMO operation by transmitting one or more layers.

The baseband processor 1520 performs conversion between a baseband signal and a bit stream in accordance with the physical layer specification of a first radio access technology. For example, for data transmission, the baseband processor 1520 generates complex symbols by encoding and modulating a transmission bit stream. Further, for data reception, the baseband processor 1520 reconstructs a reception bit stream by demodulating and decoding a baseband signal provided from the RF processor 1510. For example, in the case of utilizing OFDM, for data transmission, the baseband processor 1520 generates complex symbols by encoding and modulating a transmission bit stream, maps the complex symbols to subcarriers, and composes OFDM symbols through IFFT operation and CP insertion. Further, for data reception, the baseband processor 1520 divides a baseband signal provided from the RF processor 1510 in units of OFDM symbols, restores the signals mapped to subcarriers through FFT operation, and reconstructs the reception bit stream through demodulation and decoding. The baseband processor 1520 and the RF processor 1510 transmit and receive signals as described above. Hence, the baseband processor 1520 and the RF processor 1510 may be called a transmitter, a receiver, a transceiver, a communication unit, or a wireless communication unit.

The backhaul communication unit 1530 provides an interface for communication with other nodes in the network. That is, the backhaul communication unit 1530 converts a bit stream, which is to be transmitted from the base station to another node such as a secondary base station or the core network, into a physical signal, and converts a physical signal received from another node into a bit stream.

The storage 1540 stores data such as basic programs, application programs, and configuration information for the operation of the base station. In particular, the storage 1540 may store information on a bearer allocated to a connected UE and measurement results reported from the connected UE. Further, the storage 1540 may store information used as a criterion for determining whether to provide or suspend multi-connectivity to the UE. In addition, the storage 1540 provides stored data in response to a request from the controller 1550.

The controller 1550 controls the overall operation of the base station. For example, the controller 1550 transmits and receives signals through the baseband processor 1520 and the RF processor 1510 or through the backhaul communication unit 1530. Further, the controller 1550 writes or reads data to or from the storage 1540. To this end, the controller 1550 may include at least one processor.

For a UE supporting a first SIM and a second SIM, when the base station is a second base station of a second network corresponding to the second SIM, the controller 1550 may be configured to receive a paging message for a specific service from the core network, and control the transceiver to transmit a paging message including information indicating the specific service to the UE while the UE is in connected state with a first base station of a first network corresponding to the first SIM.

The specific service may be a VoNR service when the second network is NR, and a VoLTE service when the second network is E-UTRA.

Further, the controller 1550 may control the transceiver to receive capability information indicating that the UE supports multiple SIMs from the UE before receiving the paging message.

On the other hand, for the UE supporting the first SIM and the second SIM, when the base station is the first base station of the first network corresponding to the first SIM, the controller 1550 may control the transceiver to receive a connection release request message including information on a release cause according to a result of determination of the UE regarding whether to release the connection to the first network and to make a connection to the second network based on the paging message.

Here, the connection release request message may be a radio resource control (RRC) message.

The information on a release cause included in the connection release request message may indicate that the UE intends to connect to the second network corresponding to the second SIM.

The controller 1550 may determine whether to release the connection to the UE based on the information on the release cause.

Meanwhile, although specific embodiments have been described in the detailed description of the disclosure, various modifications are possible without departing from the scope of the disclosure. Therefore, the scope of the disclosure should not be limited to the described embodiments and should be defined by the appended claims and their equivalents.

The invention claimed is:

1. A method performed by a terminal supporting a multi subscriber identity module (multi-SIM) in a wireless communication system, the method comprising:
   receiving, from a first base station corresponding to a first SIM of the multi-SIM, a radio resource control (RRC) message including configuration information to report information for releasing an RRC connected mode;
   receiving, from a second base station corresponding to a second SIM of the multi-SIM, a paging message including a paging record with a paging cause, wherein the paging cause indicates that the paging message is related to a voice service; and
   transmitting, to the first base station, a user equipment (UE) assistance information message including preference information on a preferred RRC state.

2. The method of claim 1,
   wherein the preference information indicates one of an idle, an inactive, and an out of connected.

3. The method of claim 1,
   wherein the paging record with the paging cause is included in a paging record list, the paging record list being included in the paging message.

4. A method performed by a first base station corresponding to a first subscriber identity module (SIM) of a multi-SIM in a wireless communication system, the method comprising:
   receiving, from a terminal, capability information associated with the multi-SIM;
   transmitting, to the terminal supporting the multi-SIM, a radio resource control (RRC) message including configuration information to report information for releasing an RRC connected mode; and
   receiving, from the terminal, a user equipment (UE) assistance information message including preference information on a preferred RRC state.

5. A terminal supporting a multi-subscriber identity module (multi-SIM) in a wireless communication system, the terminal comprising:
   a transceiver; and
   at least one processor configured to:
      receive, from a first base station corresponding to a first SIM of the multi-SIM, a radio resource control (RRC) message including configuration information to report information for releasing an RRC connected mode,
      receive, from a second base station corresponding to a second SIM of the multi-SIM via the transceiver, a paging message including a paging record with a paging cause, wherein the paging cause indicates that the paging message is related to a voice service, and
      transmit, to the first base station via the transceiver, a user equipment (UE) assistance information message including preference information on a preferred RRC state.

6. The terminal of claim 5,
   wherein the preference information indicates one of an idle, an inactive, and an out of connected.

7. The terminal of claim 5,
   wherein the paging record with the paging cause is included in a paging record list, the paging record list being included in the paging message.

8. A first base station corresponding to a first subscriber identity module (SIM) of a multi-SIM in a wireless communication system, the first base station comprising:
   a transceiver; and
   at least one processor configured to:
      receive, from a terminal via the transceiver, capability information associated with the multi-SIM,
      transmit, to the terminal supporting the multi-SIM via the transceiver, a radio resource control (RRC) message including configuration information to report information for releasing an RRC connected mode, and
      receive, from the terminal via the transceiver, a user equipment (UE) assistance information message including preference information on a preferred RRC state.

9. The method of claim 4, wherein the preference information indicates one of an idle, an inactive, and an out of connected.

10. The first base station of claim 8, wherein the preference information indicates one of an idle, an inactive, and an out of connected.

* * * * *